US012198640B2

(12) United States Patent
Tu et al.

(10) Patent No.: US 12,198,640 B2
(45) Date of Patent: Jan. 14, 2025

(54) POWER MONITORING FOR CORRECTING AMBIENT TEMPERATURE MEASUREMENT BY ELECTRONIC DEVICES

(71) Applicant: Google LLC, Mountain View, CA (US)

(72) Inventors: Jeffrey Kevin Tu, Sunnyvale, CA (US); Kristen Rebecca Pownell, San Francisco, CA (US); Philip Hobson Boothby, Scotts Valley, CA (US); Arun Prakash Raghupathy, Pleasanton, CA (US); Emil Rahim, San Jose, CA (US); Chintan Trehan, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/470,821

(22) Filed: Sep. 20, 2023

(65) Prior Publication Data

US 2024/0013734 A1 Jan. 11, 2024

Related U.S. Application Data

(63) Continuation of application No. 17/002,673, filed on Aug. 25, 2020, now Pat. No. 11,798,501.

(51) Int. Cl.
*G09G 3/34* (2006.01)
*G05F 1/70* (2006.01)

(52) U.S. Cl.
CPC ................. *G09G 3/34* (2013.01); *G05F 1/70* (2013.01); *G09G 2320/0626* (2013.01); *G09G 2330/021* (2013.01); *G09G 2330/045* (2013.01)

(58) Field of Classification Search
CPC .... G09G 3/006; G09G 3/2092; G09G 3/2096; G09G 3/3233; G09G 3/3241;
(Continued)

(56) References Cited

U.S. PATENT DOCUMENTS 7,364,353 B2 * 4/2008 Kolk ........................ G01K 1/20 374/1
2007/0080905 A1 * 4/2007 Takahara ............. G09G 3/3258 345/76
2009/0144014 A1 * 6/2009 Aljabari ................... H05B 1/02 374/142
2011/0205442 A1 * 8/2011 Mori .................... G09G 3/3208 348/673

(Continued)

*Primary Examiner* — Keith L Crawley
(74) *Attorney, Agent, or Firm* — Kilpatrick Townsend & Stockton LLP

(57) ABSTRACT

This application is directed to a method for correct temperature measurement. An electronic device includes a temperature sensor that measures an ambient temperature of an environment and a display that is driven by a display driver. The electronic device determines a brightness setting of the display, estimates a display driver current based on the brightness setting, estimates a driver efficiency of the display driver based on the display driver current, and combines a predetermined display driver voltage, the display driver current, and the driver efficiency to determine a power consumption of the display driver. An ambient temperature correction is determined in accordance with the determined power consumption of the display driver, and the measured ambient temperature is thereby corrected using the ambient temperature correction. In some implementations, a power consumption of a distinct heat-generating electronic component is also monitored for adjusting the ambient temperature correction.

20 Claims, 8 Drawing Sheets

(58) Field of Classification Search
CPC ...... G09G 3/3283; G09G 3/34; G09G 3/3685; G09G 3/3688; G09G 5/003; G09G 5/006; G09G 2310/0272; G09G 2320/041; G09G 2320/0626; G09G 2320/0693; G09G 2330/00; G09G 2330/02; G09G 2330/021; G09G 2330/04; G09G 2330/045; G09G 2330/12; G09G 2360/08; G06F 1/1601; G06F 1/1605; G06F 1/1613; G06F 1/1626; G06F 1/1637; G06F 1/1656; G06F 1/1658; G06F 1/1684; G06F 1/1688; G06F 1/183; G06F 1/184; G06F 1/20; G06F 1/203; G06F 1/206; G06F 1/28; G06F 1/3203; G06F 1/3218; G05F 1/70; G01D 3/028; G01D 3/032; G01D 3/036; G01D 3/0365; G01K 1/20; G01K 15/00; G01K 15/002; G01K 15/005; G01K 15/007
See application file for complete search history.

(56) References Cited

U.S. PATENT DOCUMENTS

2013/0275064 A1* 10/2013 Tseng ..................... G01R 21/02 702/60
2014/0198451 A1* 7/2014 Kuo ....................... G01K 1/026 361/695
2014/0328368 A1* 11/2014 Niederberger ........... G01K 1/20 374/1
2015/0292959 A1* 10/2015 Graf ..................... G01K 15/005 374/1
2016/0069753 A1* 3/2016 Phan Le ............. H04M 1/0202 702/130
2016/0372035 A1* 12/2016 Nakatani .............. G09G 3/3233
2017/0229531 A1* 8/2017 Shi ....................... H10K 50/828
2018/0066998 A1* 3/2018 Merrikh ................... G01K 1/14
2018/0199123 A1* 7/2018 Rao ......................... G06F 3/041
2019/0339312 A1* 11/2019 Dunn ...................... H04L 67/51
2021/0082352 A1* 3/2021 Lee ...................... G01K 15/005

* cited by examiner

POWER MONITORING FOR CORRECTING AMBIENT TEMPERATURE MEASUREMENT BY ELECTRONIC DEVICES

CROSS-REFERENCE TO RELATED APPLICATION

This application is a continuation of U.S. patent application Ser. No. 17/002,673 filed Aug. 25, 2020, entitled "Power Monitoring for Correcting Ambient Temperature Measurement by Electronic Devices," the entire disclosure of which is hereby incorporated by reference, for all purposes, as if fully set forth herein.

TECHNICAL FIELD

This application relates generally to ambient temperature monitoring including, but not limited to, methods for determining power consumption of heat generating components (e.g., a display panel, a speaker, and a processor core) of an electronic device for correcting an ambient temperature measured by an internal temperature sensor of the electronic device.

BACKGROUND

Many electronic devices include temperature sensors intended to measure ambient temperatures of environments in which the electronic devices are located. Such electronic devices often have a compact form factor and enclose the temperature sensor and heat generating electronic components within the same housing. Measurements made by the temperature sensor can be affected by heat from the heat generating electronic components, which results in an inaccurate ambient temperature measurement by the temperature sensor. Thermal insulation is often employed to attempt to isolate the temperature sensor physically and thermally from the heat generating components. However, this adds manufacturing complexity and is not always effective, particularly in compact electronic devices.

SUMMARY

This disclosure describes methods for correcting an ambient temperature measured by a temperature sensor of an electronic device (e.g., a display assistant device) based on power consumption of a display driver and/or other heat generating components within the electronic device. The temperature sensor is enclosed in the housing of the electronic device with the display driver and heat generating components. Measurement of the ambient temperature by the temperature sensor may be sensitive to operations of the display driver, WiFi radios, and other heat-generating components. Power consumption levels of the display driver and other heat generating components are individually measured or estimated in real-time. These power consumption levels are employed to determine a correction factor that is applied to the ambient temperature measured by the temperature sensor. In some implementations, heating models are established for a particular device based on component specifications and real time power consumption values, and enables correction of the measured ambient temperature to within a predefined error tolerance (e.g., +1° C., +0.5° C.) with respect to an actual ambient temperature of an environment in which the electronic device is located.

In one aspect, some implementations include a method performed at an electronic device for correcting a temperature measurement of an on-board temperature sensor. An ambient temperature of an environment is measured by a temperature sensor of the electronic device. The electronic device further includes a display panel driven by a display driver. The electronic device determines a power consumption of the display driver by determining a brightness setting of the display panel, estimating a display driver current based on the brightness setting, estimating a driver efficiency of the display driver based on the display driver current, and determining the power consumption of the display driver based on a predetermined display driver voltage, the display driver current, and the driver efficiency. In accordance with the determined power consumption of the display driver, the electronic device determines an ambient temperature correction, and corrects the measured ambient temperature using the ambient temperature correction. In some implementations, the electronic device further includes one or more additional heat-generating electronic components (e.g., a speaker box, a processor core and/or communications radio). A power consumption of the additional heat-generating electronic component(s) is measured using a power monitoring unit, and the ambient temperature correction is determined based on both the power consumption of the display driver and the power consumption of the additional heat-generating electronic component(s).

Thus, systems and devices are provided for correcting temperature measurement of a temperature sensor in an electronic device, particularly when the electronic device has a compact form factor and/or the temperature sensor is disposed in proximity to internal heat sources.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

Like reference numerals refer to corresponding parts throughout the several views of the drawings.

DETAILED DESCRIPTION

In various implementations, an ambient temperature measured by a temperature sensor of an electronic device (e.g., a display assistant device) is corrected based on power consumption(s) of a display driver and/or one or more heat generating components of the electronic device. The electronic device has a compact form factor in which the temperature sensor is disposed in proximity to the display driver and other heat generating components, such that the temperature sensor is sensitive to heat generated by the display driver and other heat generating components. In a display assistant device, three primary heat sources that impact ambient temperature measurement include a display panel and a display driver, a speaker, and electronic components integrated on a main logic board (MLB). These three primary heat sources are spatially separate from each other and do not exchange electrical inputs and outputs with each other. As such, each of the three primary heat sources of the display assistant device is separately monitored to determine a respective impact on measurement of the ambient temperature, and an ambient temperature correction may be approximated based on a combination of the impacts of these three primary heat sources.

Among the primary heat sources that impact ambient temperature measurement, an impact of each heat source is determined based on its power consumption, and the power consumption is either measured from real time operations of the heat source or estimated based on characteristics of the heat source. For example, in some implementations, power consumption of the speaker or the electronic components of the MLB is measured directly using a power monitoring unit. Conversely, the power monitoring unit is not employed to measure the power consumption of the display panel and display driver of the electronic device. Rather, the power consumption of the display driver is estimated based on the display driver voltage, display brightness setting, and driver efficiency of the display driver. The ambient temperature measured by the temperature sensor is corrected based on the power consumption of the heat sources, independently or in combination, thereby providing a corrected ambient temperature that optionally satisfies an ambient temperature accuracy requirement corresponding to a temperature error tolerance (e.g., ±1° C.).

Figure 1:
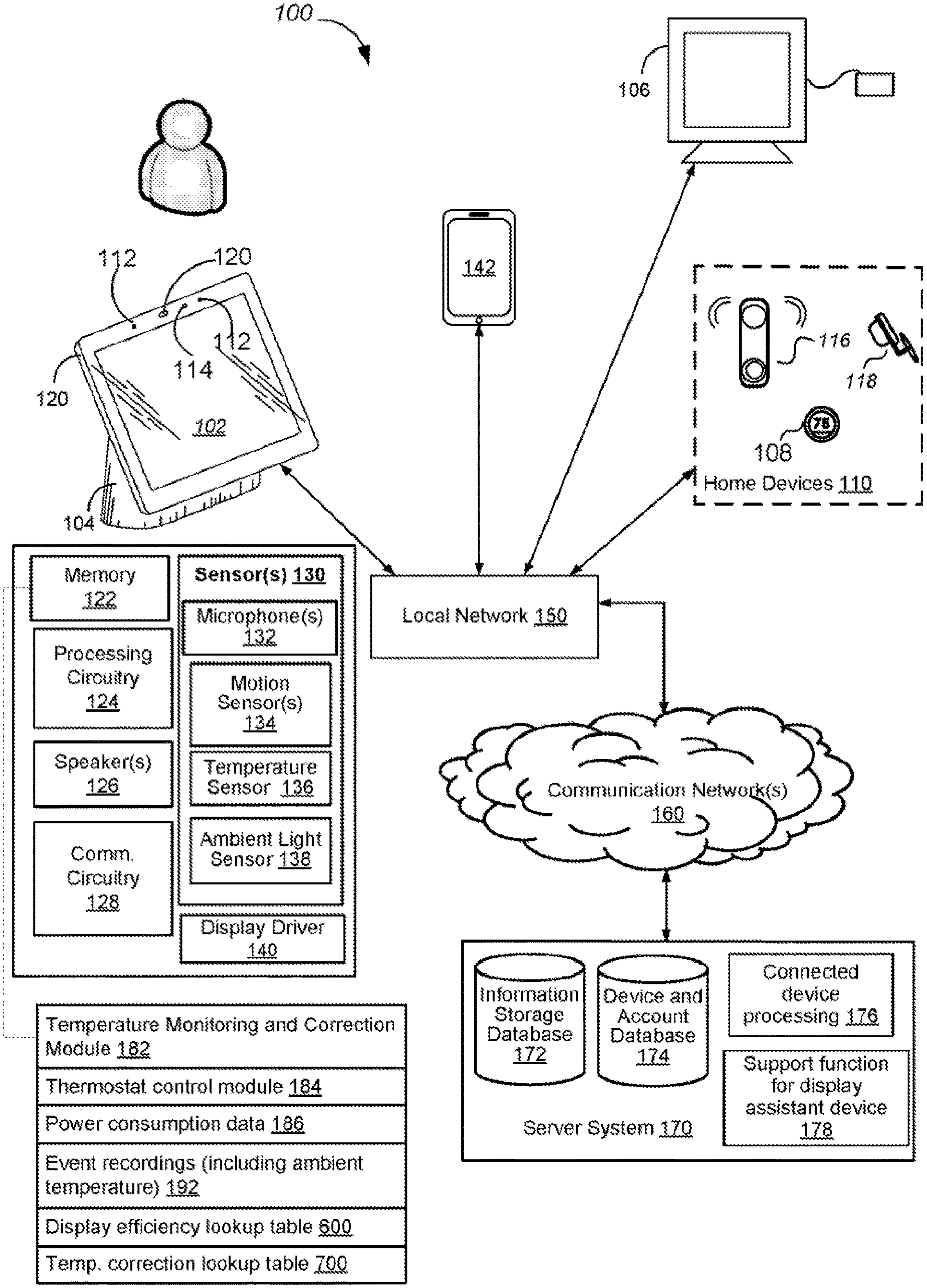
FIG. 1 is an example home or office environment including a display assistant device, in accordance with some implementations.

FIG. 1 is an example home or office environment 100 including a display assistant device 120, in accordance with some implementations. The display assistant device 120 is a standalone, free-standing device that can be placed in a home or office environment. The display assistant device 120 is responsive to voice inputs collected by its microphone(s) 132 and provides visual information in addition to audio information that can be broadcast via a speaker 126 of the display assistant device 120. When a user is nearby and his or her line of sight is not obscured, the user may review the visual information directly on a display screen 102. Optionally, the visual information provides feedback to the user of the display assistant device 120 concerning a state of audio input processing of the voice inputs. Optionally, the visual information is provided in response to the user's previous voice inputs (e.g., "Please play Bach with YouTube"), and may be related to the audio information (e.g., Bach Cello Suite No. 1) broadcast by the speaker 126. In some implementations, the display screen 102 of the display assistant device 120 includes a touch display screen configured to detect touch inputs on its surface. Alternatively, in some implementations, the display screen 102 is not a touch display screen, which is relatively expensive and can compromise a goal of offering the display assistant device 120 as a low cost user interface solution.

In addition to the display assistant device 120, the home environment 100 includes various devices (also referred to herein as "connected" or "integrated" devices) that are interconnected via a local network 150. In some implementations, the devices include one or more of: a wearable device (e.g., a smart watch) that is worn by a user of the home environment 100, a mobile device 142, a media output device 106, and home devices 110. In some implementations, the home devices 110 include one or more of: a thermostat 108, a connected doorbell/camera 116, and a camera 118. The thermostat 108 detects ambient climate characteristics (e.g., temperature and/or humidity) and controls a heating, ventilation, and air conditioning (HVAC) system (not shown) of the home environment 100 accordingly. The connected doorbell/camera 116 alerts the user to the presence of people and/or packages at the front door and monitors activity at the front door. The camera 118 may be part of a home security system that allows the user to track activity around the home environment 100.

By virtue of network connectivity, a user may control the connected devices in the home environment 100 even if the user is not proximate to the devices. As one example, the user may use the display assistant device 120 to view or adjust a current set point temperature of the thermostat 108 (e.g., via the local network 150 and through a communication circuitry 128 of the display assistant device 120). In some implementations, the display assistant device 120 includes program modules that can control the home devices 110 without user interaction. For example, as described below, program modules installed on the display assistant device 120 can control the thermostat 108 to adjust a room temperature of the environment 100 based on the room temperature measured by a temperature sensor 136 of the display assistant device 120. As another example, the camera 118 may store video data locally and wirelessly stream video data to the mobile device 142 or the display assistant device 120 via communication network(s) 160 and/or the local network 150.

In some implementations, at least a subset of the connected devices is also communicatively coupled to a server system 170 through communication network(s) 160. The sever system 170 includes one or more of: an information storage database 172, a device and account database 174, a connected device processing module 176, and a support function for display assistant device module 178. For example, the camera 118 may stream video data to the server system 170 via the communication network(s) 160 for storage on the server system 170 (e.g., the information storage database 172) or for additional processing by the server system 170. The user may access the stored video data using the mobile device 104 (or the display assistant device) via the communication network(s) 160.

In some implementations, the user establishes a user account (e.g., a Google™ user account) with the server system 170 and associates (e.g., adds and/or links) one or more connected devices with the user account. The server system 170 stores information for the user account and associated devices in the device and account database 174.

The server system 170 enables the user to control and monitor information from the connected home devices 110 via the connected device processing module 176 (e.g., using an application executing on the mobile device 104 or assistant capabilities of some of the home devices 110). The user can also link the display assistant device 120 to one or more of the connected home devices 110 via the user account. This allows program modules executing on the display assistant device 120 to receive sensor data and other information collected by the home devices 110 via the server system 170 or send commands via the server system 170 to the home devices 110.

One or more sensors 130 are integrated into the display assistant device 120 and include one or more of: microphone(s) 132, motion sensor(s) 134, a temperature sensor 136, and an ambient light sensor 138. In some implementations, the display assistant device 120 does not have a camera so as to protect the privacy of the user in view of the display assistant device 120. The sensor(s) 130 detect and record sound, movement, and/or ambient conditions (e.g., temperature and light level) in proximity to the display assistant device 120. As used herein, "sound, movement, and/or ambient conditions" are referred to collectively as "events" or "signals." Recorded sound, movement, and/or ambient conditions are also collectively known as "recorded events" or "recorded signals". Each of the recorded events is associated with a respective date stamp and timestamp. In some implementations, the recorded events are stored (e.g., as event recordings 192) and processed locally on the display assistant device 120. In some implementations, the display assistant device 120 sends at least a subset of the recorded events to the server system 170 (e.g., to the support function for display assistant device module 178) via the communication network(s) 160 for storage and processing.

In some implementations, the display assistant device 120 includes a base 104 in addition to the display screen 102. The display assistant device 120 has a bezel area surrounding an active display area of the display screen 102. In some implementations, the bezel area includes one or more microphone holes 112, one or more sensor openings 120, and an indicator window 114. One or more microphones 132 are placed behind the microphone holes 112 and collect sound (e.g., including both sound made by a user and ambient sound) in proximity to the display assistant device 120. In some implementations, the display assistant device 120 functions as a voice assistant device and the microphones collect audio inputs for initiating various media play functions of the display assistant device 120 and/or a media output device, or controlling various home devices disposed in the home or office environment where the display assistant device 120 is disposed. Additionally, an indicator may be disposed behind the indicator window 114. In some implementations, the indicator provides a sequential lighting pattern to indicate whether the display assistant device 120 is active or inactive, whether the microphone(s) 132 and/or speaker(s) 126 of the display assistant device 120 are muted or not, and/or a processing state (e.g., detecting, recording, analyzing, displaying, and/or speaking).

In some implementations, the sensor opening 120 exposes a motion sensor 134, which records movement in proximity to the display assistant device 120. In some implementations, the sensor opening 120 exposes one or more ambient sensors (e.g., the temperature sensor 136 and the ambient light sensor 138) that monitor and record ambient conditions (e.g., temperature and light level) in proximity to the display assistant device 120. In some implementations, the display assistant device 120 includes multiple sensor openings 120, and each sensor opening 120 exposes one of the one or more ambient sensors with which the display assistant device 120 is equipped.

Specifically, in some implementations, the sensor opening 120 is open to air. The temperature sensor 136 is located in the sensor opening 120 and configured to measure an ambient temperature of the home or office environment where the display assistant device 120 is located. The ambient temperature is optionally used to analyze a sleep quality of a user or control one or more home devices (e.g., an HVAC system) in the same home or office environment 100. In some implementations, the display assistant device 120 has a compact form factor, e.g., when the display assistant device 120 preferably has a geometric dimension that can fit into and/or merge with most home or office environments. The display assistant device 120 contains the processing circuitry 124, memory 122, the speaker(s) 126, microphone(s) 132, and display screen 102 within a limited space of a device housing of the display assistant device 120. The temperature sensor 136 may unavoidably be disposed in proximity to one or more of heat generating components (e.g., the display driver 140, speaker(s) 126 or processing circuitry 124) and cannot be entirely insulated from heat generated by these components. In some implementations, an ambient temperature measured by the temperature sensor 136 is corrected based on power consumptions of these heat generating components.

In some implementations, the display assistant device 120 includes memory 122, processing circuitry 124, speaker(s) 126, communication circuitry 128 (e.g., network interface(s)), and sensor(s) 130. The memory 122 stores programs that, when executed by elements of the processing circuitry 124, perform one or more of the functions described with reference to FIGS. 1 to 8. For example, in some implementations, the stored programs include a temperature monitoring and correction module 182 that collects and analyzes temperature sensor data, estimates power consumption of a display driver 140, measures power consumption of one or more additional heat generating components, and determines an ambient temperature and corresponding temperature correction. In some implementations, the stored programs further includes a thermostat control module 184 that uses an ambient temperature measured by the temperature sensor 136 and corrected by the module 182 to control the thermostat 108 in the same home or office environment 100. In some implementations, the memory 122 also stores power consumption data 186 for the display driver 140 and one or more additional heat generating components of the display assistant device 100. Further, in some implementations, the memory 122 also stores data used to estimate or determine the power consumption data 186, e.g., a display efficiency lookup table 600 and a temperature correction lookup table 700.

Figure 2:
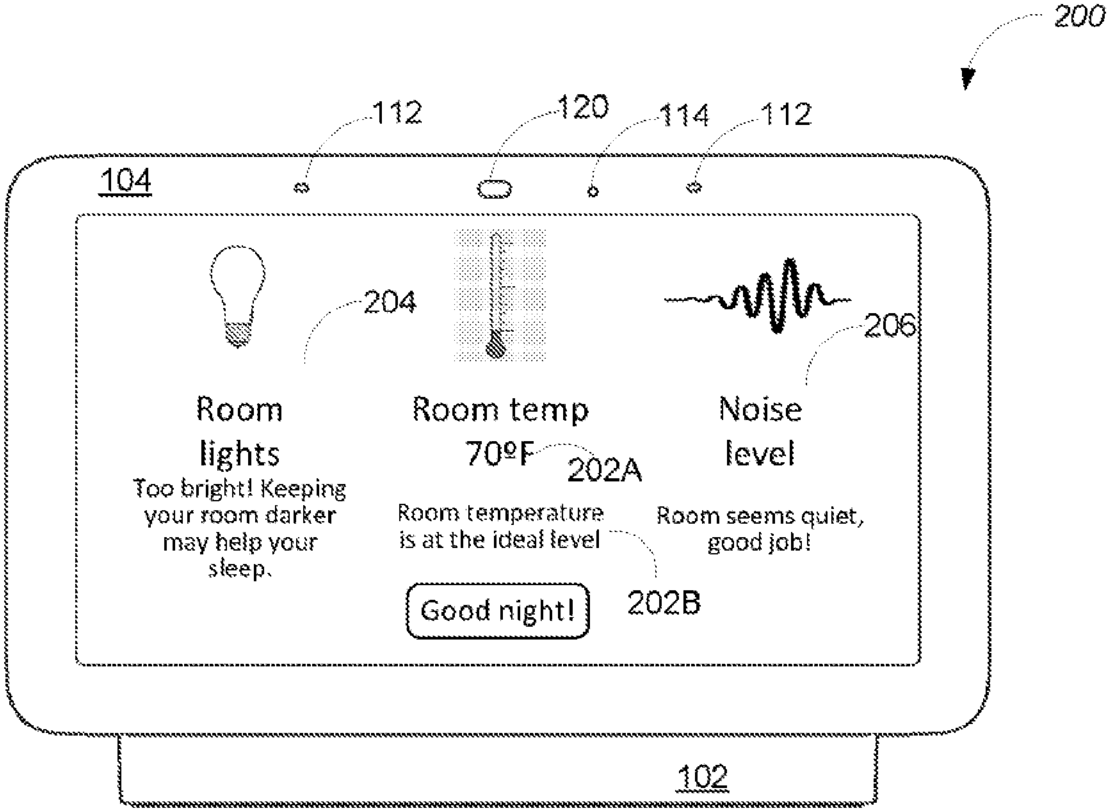
FIG. 2 is an example graphical user interface (GUI) displayed on a display screen of a display assistant device, in accordance with some implementations.

FIG. 2 is an example graphical user interface (GUI) 200 displayed on a display screen 102 of a display assistant device 120, in accordance with some implementations. An environment summary page is displayed on the GUI 200 and presents at least room temperature information 202. In some situations, this environment summary page is presented at night before a user of the display assistant device 120 falls asleep and is used to help the user create a sleep-friendly environment. The room temperature information 202 may include an affordance 202A showing an ambient temperature value and a first message 202B (e.g., "Room temperature is at the ideal level"). The ambient temperature value shown with the affordance 202A is measured by a temperature sensor 136 that is optionally disposed behind and exposed from a sensor opening 120 on the display screen 102 of the display assistant device 120. In some implementations, the environment summary page on the GUI 200 further includes room light information 204, noise information 206 or both in addition to the room temperature information 202.

Referring to FIG. 1, in some embodiments, the ambient temperature measured by the temperature sensor is used to control one or more connected home devices 110, e.g., a thermostat 108 of the HVAC system. The display assistant device 120 is optionally coupled to the connected home devices 110 via a local area network 150, and information of the ambient temperature or a temperature-based device control command is communicated to one or more of the connected home devices. Alternatively, both the display assistant device 120 and connected home devices 110 are coupled to a remote server system 170 via one or more communication networks 160, and the information of the ambient temperature or the device control command is communicated to one or more of the connected home devices 110 via the server system 170. Data communications of the information of the ambient temperature or device control command may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this application. Given such an extended capability of controlling a home device wirelessly, the display assistant device 120 is required to measure the ambient temperature accurately, e.g., within ±1° C. of an actual ambient temperature.

Figure 3:
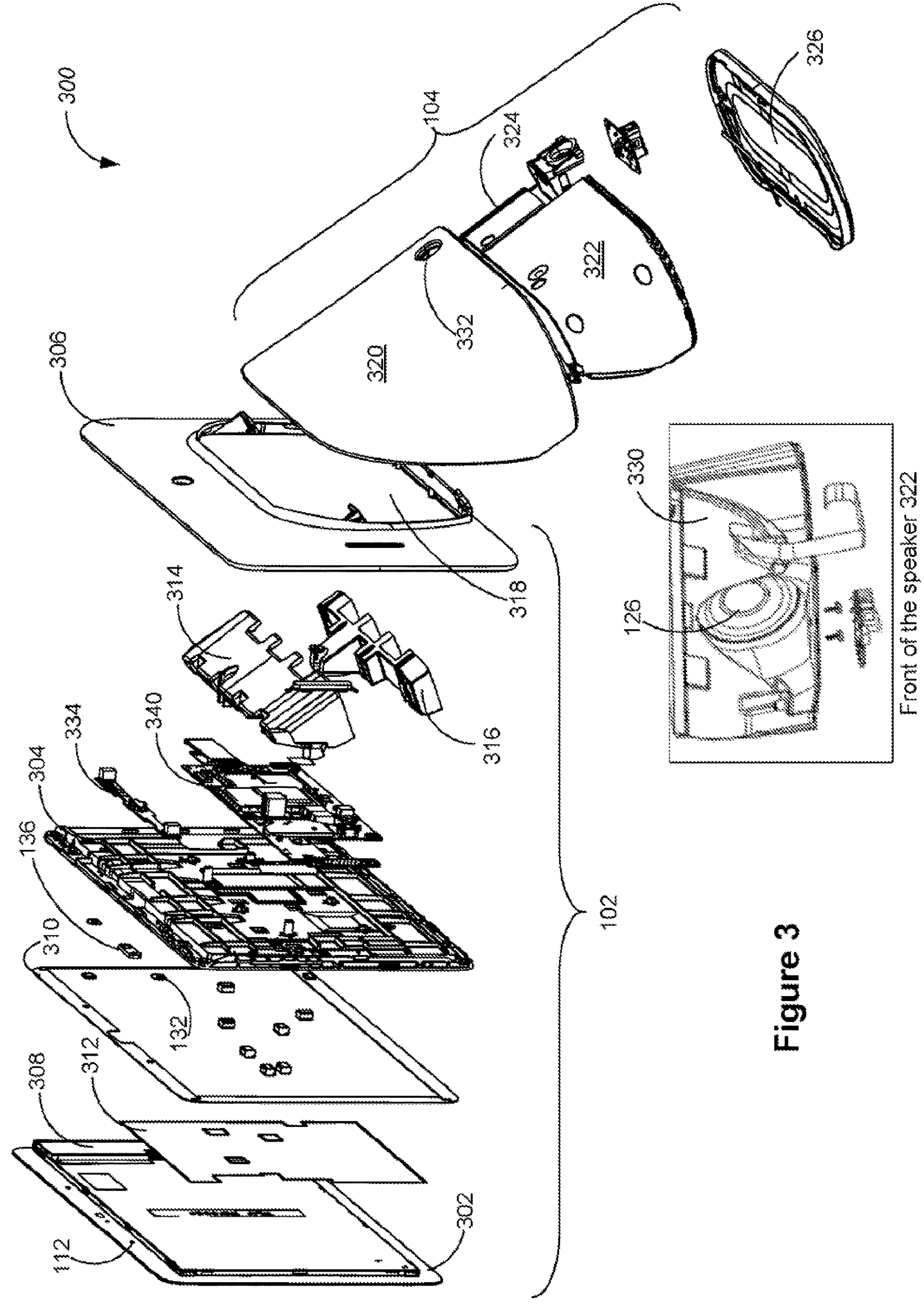
FIG. 3 is an exploded view of an example display assistance device, in accordance with some implementations.

FIG. 3 is an exploded view 300 of an example display assistance device 120, in accordance with some implementations. The display assistant device 120 includes a base 104 and a display screen 102. The display screen 102 of the display assistant device 120 includes a display panel 302, a middle frame 304 and a back cover 306. The display panel 302 is coupled to a display module 308 that includes a display driver and is configured to provide backlight sources and drive individual display pixels of the display panel 302. Optionally, the display module 308 is disposed adjacent to an edge of the display panel 302. The display panel 302 and the middle frame 304 are mechanically coupled to each other using an adhesive 310 that is applied adjacent to edges of the display panel 302 and middle frame 304. A thermal spreader 312 can be placed between and comes into contact with the display panel 302 and middle frame 304 for redistributing heat generated by the display panel 302.

In some implementations, the display assistant device 120 further includes a main logic board (MLB) 340 mounted on a rear surface of the middle frame 304. The MLB 340 includes electronic components that generate heat. A heat sink 314 is attached to the MLB 340 to absorb some of the generated heat. The MLB 340 and the heat sink 314 are attached to the rear surface of the middle frame 304, which is further assembled with the display panel 302 and the back cover 306. The back cover 306 includes a first opening 318 at a central portion of the rear surface of the display screen 102. When the back cover 306 is assembled onto the display screen 102, the MLB 340 and the heat sink 314 are aligned with the first opening 318 and protrude out of the first opening 318 of the back cover 306.

In addition to the MLB 340, the display assistant device 500 includes a control board 334. The control board 334 is disposed adjacent to a long edge of the middle frame 304 and configured to drive at least one or more microphones 342 and monitor signals from one or more sensors (e.g., a temperature sensor 136).

The base 104 of the display assistant device 120 includes a base housing 320, a speaker assembly 322, a power board 324 and a base mount plate 326. The base housing 320 encloses the speaker assembly 322 and includes a plurality of speaker grill portions that permit sound generated by the speaker assembly 322 to exit the base housing 320 of the base 104. Referring to a front view of the speaker assembly 322, the speaker assembly 322 includes a speaker 126 embedded in a speaker waveguide 330. Referring to FIG. 1, the speaker 126 faces a space of the predefined height h that is configured to separate the bottom edge 108 of the display screen 102 and a surface on which the display assistant device 120 sits. In some implementations, the base housing 320 is covered by a fabric, and the plurality of speaker grill portions are concealed behind the fabric. Stated another way, the plurality of speaker grill portions are not visible to a user of the display assistant device 120 from an exterior look. The fabric is cut open at the power adapter interface 332 and wrapped around a circular edge of the power adapter interface 332.

Figure 4A:
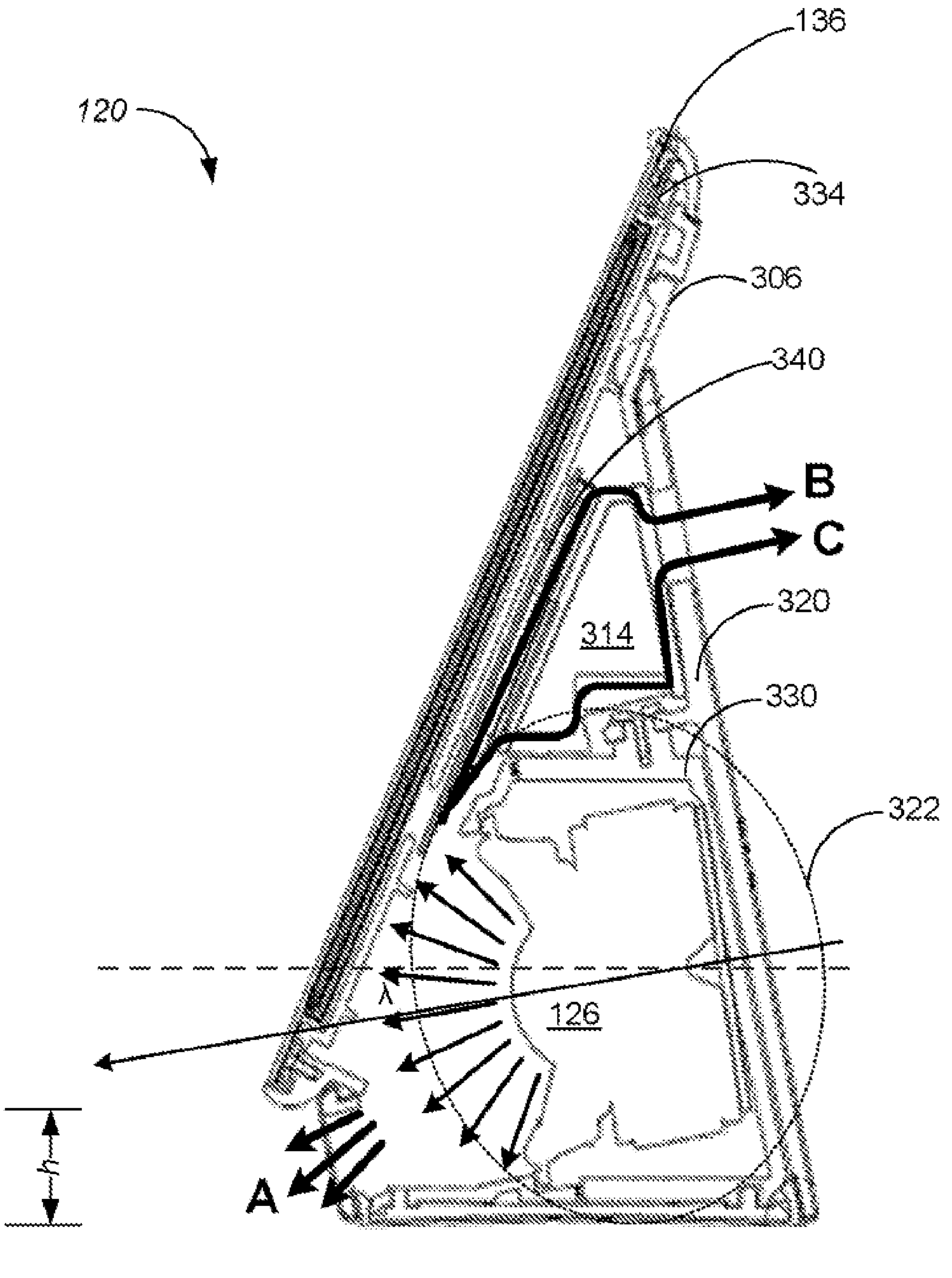
FIG. 4A is a cross sectional view of an example display assistant device.
Figure 4B:
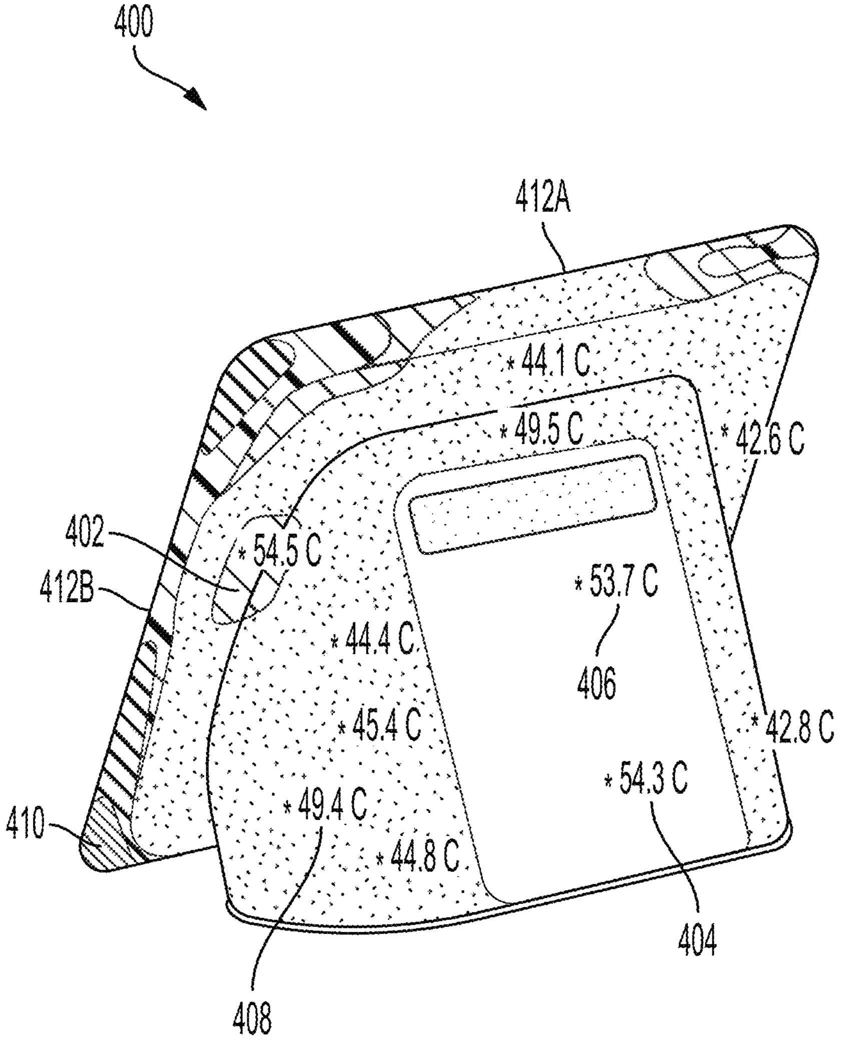
FIG. 4B is an example temperature profile of a display assistant device when the display assistant device operates in an active state, in accordance with some implementations.

FIG. 4A is a cross sectional view of an example display assistant device 120 that is assembled from a display screen 102 and a base 104, and FIG. 4B is an example temperature profile 400 of a display assistant device 120 when the display assistant device 120 operates in an active state, in accordance with some implementations. As explained above, the back cover 306 is assembled onto the display screen 102, and the MLB 340 and the heat sink 314 protrude out of the first opening 318 of the back cover 306. The speaker assembly 322 includes a speaker 126 embedded in a speaker waveguide 330 and is enclosed within the base housing 320. When the display screen 102 is assembled onto the base 104, the MLB 340 and heat sink 314 fits into a recess formed on top of the speaker assembly 322 in the base housing 320, such that the MLB 340 and heat sink 314 is enclosed by the display screen 102, speaker assembly 322 and base housing 320.

The speaker 126 is configured to project sound substantially towards a front view of the display assistant device 120, i.e., project a substantial portion of sound generated by the speaker 126 towards the space between the bottom edge of the display screen 102 and the surface where the display assistant device 120 sites. The base housing 320 of the base 104 includes a plurality of speaker grill portions disposed on one or more of a front surface, a rear surface, a left side and a right side of the base 104. In some implementations, a substantial portion (e.g., 80% or more) of the sound generated by the speaker 126 exits the base 104 via speaker grill portions on the front surface of the base 104. Remaining portions of the sound generated by the speaker 126 are guided inside the base housing 320 to exit the base 104 via a subset of speaker grill portions that are disposed on one or more of the rear surface, left side and right side of the base 104. During the course of projecting the sound out of the base housing 320, the speaker 126 also helps carry heat generated by heat generating components (e.g., the MLB 340, speaker 126, and display panel 302) with air. As such, the heat is carried out via the front and rear surfaces of the base 104, e.g., along one or more of a plurality of sound propagation paths A, B and C.

In some implementations, a temperature sensor 136 is enclosed within a device housing of the display screen 102 and near a top edge of the display screen 102. The device housing of the display screen 102 may have a sensor opening 120 exposing the temperature sensor 136 to the air, such that the temperature sensor 136 can measure an ambient temperature accurately. The control board 334 is disposed adjacent to the top edge of the display screen 102 and configured to monitor signals from the temperature sensor 136. In some implementations, the temperature sensor 136 is at least partially insulated thermally from the heat-generating electronic components (e.g., the MLB 340). Further, the temperature sensor 136 may be positioned within the device 120 to be as far as possible from the heat generating components, heat sink 314, and sound propagation paths. For example, referring to FIG. 4A, the temperature sensor 136 could be disposed at a corner of the display screen 102.

In some implementations, a location of the temperature sensor 136 in the display assistant device 120 is determined based on an average distance of the temperature sensor 136 from a selection of heat generating components. The selection of heat generating components includes a number of (e.g., 3) heat generating components that generate the greatest amount of heat among all heat generating components of the display assistant device 120. In an example, the location of the temperature sensor 136 is determined based on an average distance from the speaker 126, MLB 340 and display module 308. The average distance from the selection of heat generating components may be a weighted average of the temperature sensor's distances from the selected heat generating components. Each selected heat generating component corresponds to a weight that is optionally determined based on a thermal conduction rate between the temperature sensor and the respective selected heat generating component. In some implementations, the temperature sensor 136 is disposed at a location where the average distance of the temperature sensor 136 from the selected heat generating components is maximized, which ensures that an ambient temperature measured by the temperature sensor 136 is least impacted by the selected heat generating components and can be corrected to satisfy an ambient temperature accuracy requirement.

Referring to FIG. 4B, the heat generating components of the display assistant device 120 may create a plurality of hot areas. For example, the display module 308 creates a first hot area 402 having a peak temperature of 54.5° C., and a speaker 126 creates a second hot area 404 having a peak temperature of 54.3° C. The heat sink 314 also creates a third hot area 406 having a peak temperature of 53.7° C. This third hot area 406 is caused by heat generated by the MLB 340, which is hidden behind the heat sink 314. A power control board is embedded on a side of the speaker waveguide 330 and creates a fourth hot area 408 having a peak temperature 49.4° C. In this example, the display module 308, the speaker 126, and the MLB 340 are three primary heat sources in the display assistant device 120. A substantial portion of the display assistant device 120 has a temperature raised above the ambient temperature as a result of the hot areas or region created by the heat generating components of the display assistant device 120.

In some situations, a lower corner 410 of the display screen 102 is least impacted by the heat generated by the heat generating components of the display assistant device 120, and shows the smallest temperature increase during operation of the device 120 compared with other portions of the display assistant device 120. The temperature sensor 136 is disposed in the lower corner 410 and immediately adjacent to the device housing of the display screen 102. Alternatively, in some embodiments, an edge region 412A or 412B of the display screen 102 is not least impacted by the heat generating components of the display assistant device 120, but still, has a relatively small temperature increase (e.g., less than 10° C.). The temperature sensor 136 is disposed in the edge region 412A or 412B of the display screen 102 and corresponds to an ambient temperature error that can be accurately corrected based on power consumptions of the heat generating components of the display assistant device 120.

Figure 5:
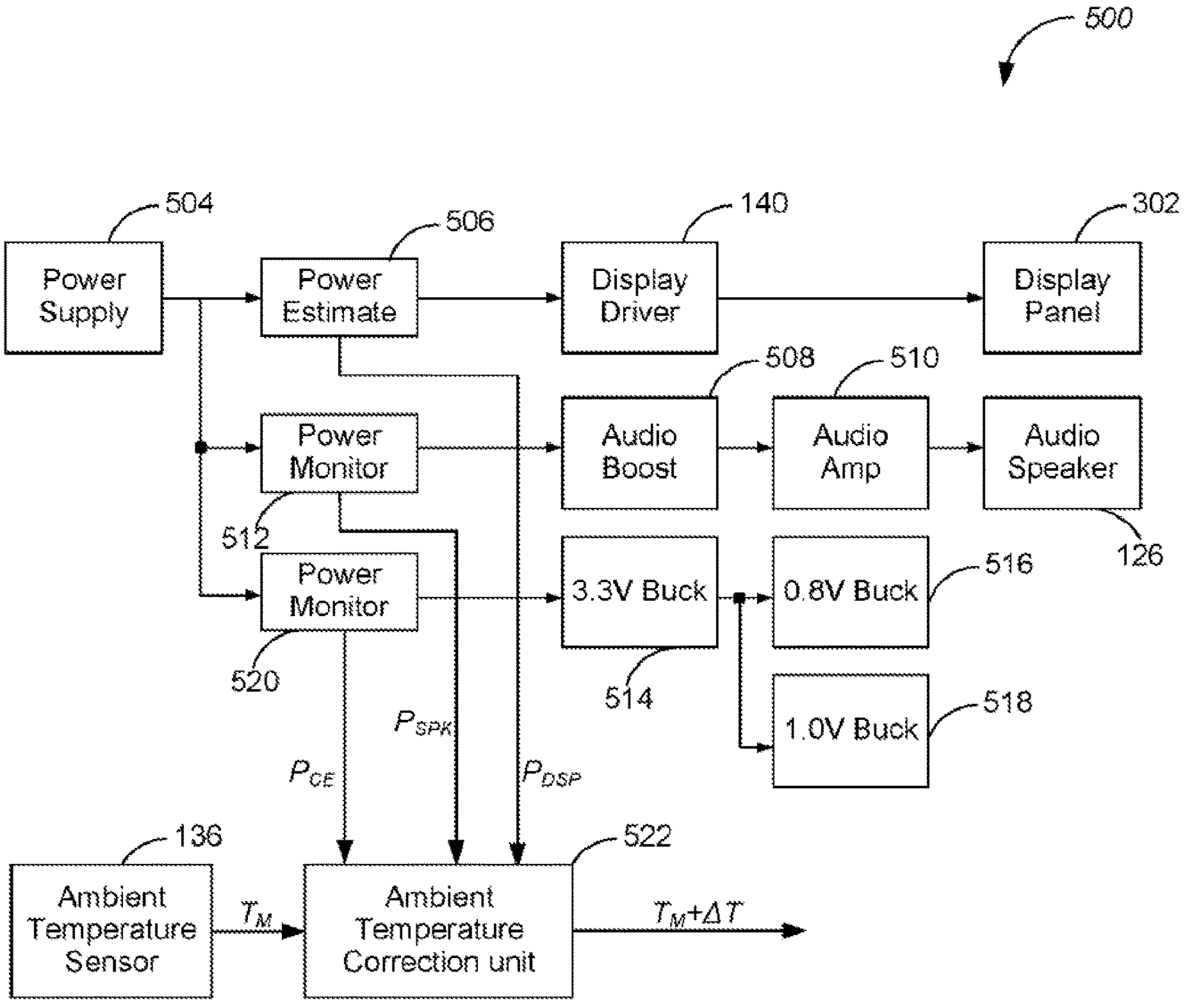
FIG. 5 is a temperature correction system of a display assistant device that corrects a temperature measurement of an ambient temperature by an internal temperature sensor, in accordance with some implementations.

FIG. 5 is a temperature correction system 500 of a display assistant device 120 that corrects a temperature measurement of an ambient temperature by an internal temperature sensor 136, in accordance with some implementations. The temperature sensor 136 measures an ambient temperature TAI of an environment in which the display assistant device 120 is disposed. In some implementations, the measured ambient temperature Tyr is corrected to cancel a measurement error that is caused by heat generated by operation of a display panel 302 driven by a display driver 140. The display driver 140 is driven by a power supply 504 and generates display drive signals to drive a plurality of display pixels of the display panel 302. A power consumption $P_{DSP}$ of the display driver 140 is determined and used to derive an ambient temperature correction ΔT.

In some implementations, the temperature correction system 500 includes a power estimation module 506 coupled to the display driver 140. The power estimation module 506 obtains information of the predetermined display driver voltage $V_D$ and the brightness setting of the display panel 302, and determines the power consumption $P_{DSP}$ of the display driver 140. Specifically, in some implementations, the power consumption $P_{DSP}$ of the display driver 140 is estimated by the power estimation module 506 based on a display power equation as follows:

$$P_{DSP}=V_D I_D/\eta_D \tag{1}$$

where $V_D$, $I_D$, and $\eta_D$ are a display driver voltage, a display driver current, and a driver efficiency of the display driver 140, respectively. In some implementations, the display driver voltage $V_D$ is predetermined. When the display driver 140 is configured to drive one or more backlight light emitting diodes (LEDs), the display driver voltage $V_D$ is used to drive the one or more backlight LEDs. In practice, the display driver voltage $V_D$ may be estimated using a typical driver voltage published in a datasheet of the display driver 140. A display driver voltage error (e.g., up to 8% in some corner cases) is introduced when the display driver voltage $V_D$ deviates from the typical driver voltage. Next, the display driver current $I_D$ is determined based on a brightness setting of the display panel 302. A maximum display driver current is associated with a maximum brightness level, e.g., by factory calibration or according to predefined specifications of the display driver 140. A linear relationship exists between the brightness setting and the display driver current $I_D$. Given the brightness setting, the display driver current $I_D$ is estimated based on the linear relationship. Further, the display efficiency $\eta_D$ is optionally predetermined at an average efficiency level (e.g., 94%) that is calibrated from a plurality of display drivers 140. This fixed display efficiency $\eta_D$ may be applied independently of the brightness setting and corresponding display driver current. Alternatively, in some implementations, the display efficiency $\eta_D$ is adjusted based on the display driver current $I_D$. As such, the power consumption $P_{DSP}$ of the display driver 140 is determined by combining the predetermined display driver voltage $V_D$, the display driver current $I_D$, and the driver efficiency $\eta_D$.

Additionally, in some implementations, the display assistant device 120 includes one or more additional heat generating components, e.g., a speaker 126 and electronic components on an MLB 340. For example, the speaker 126 is driven by an audio booster 508 and an audio amplifier 510. The audio booster 508 and amplifier 510 are powered by the power supply 504 of the display assistant device 120. A first power monitoring unit 512 is coupled between the power supply 504 and the audio booster 508 and amplifier 510, and configured to measure a power consumption PSPK of the speaker 126 directly. Specially, the first power monitoring unit 512 measures an electronic voltage and electronic current driving the speaker 126, and determines the power consumption PSPK based on the measured electronic voltage and electronic current. In some situations, the first power monitoring unit 512 has a sampling rate and a power averaging frequency. The electronic voltage and electronic current driving the speaker 126 are measured at the sampling rate and averaged during each power averaging duration corresponding to the power averaging frequency. The power consumption PSPK of the speaker 126 is determined based on the averaged electronic voltage and current during each power averaging duration. Stated another way, during each power averaging duration, power consumption levels of the speaker 126 and its associated circuit (e.g., the audio booster 508 and amplifier 510) are determined according to the sampling rate and based on the electronic voltage and current, and these sampled power consumption levels are averaged to determine the power consumption PSPK of the speaker 126.

In an example, the first power monitoring unit 512 is based on an integrated analog-to-digital converter (ADC). When a number of electronic voltage and current values driving the speaker 126 are measured and accumulated, the first power monitoring unit 512 calculates an average electronic voltage, current or power consumption value, and stores the average value in a register of the display assistant device 120 for retrieval. The first power monitoring unit 512 optionally has a conversion time selected from conversion time range (e.g., between 140 μs and 8.244 ms) and corresponding to a sampling rate. The first power monitoring unit 512 may define the number of electronic voltage and current values that are averaged, e.g., as any integer number between 1 and 1024. In an example, a voltage conversion time is 140 μs and a current conversion time is 8.244 ms. The number of electronic voltage and current values that are averaged is 16. The power consumption $P_{SPK}$ of the speaker 126 is averaged every 134 ms.

Alternatively, in some implementations, the one or more additional heat generating components include electronic components (e.g., processing circuitry 124 including a processor core) integrated on the MLB 340. For example, the electronic components on the MLB 340 are driven by a plurality of supply units 514, 516 and 518 that are coupled to and generated from the power supply 504 of the display assistant device 120. Each of the supply units 514-518 is further coupled to, and configured to drive, a respective subset of electronic components. A second power monitoring unit 520 is coupled to one of the supply units 514-518 to measure a power consumption $P_{EC}$ of the corresponding subset of electronic components. For example, the supply unit 518 is coupled to drive the processor core of the MLB 340, and the second power monitoring unit 520 can be coupled to the supply unit 518 to measure the power consumption of the processor core. Like the first power monitoring unit 512, the second power monitoring unit 520 optionally measures an electronic voltage and an electronic current driving the corresponding supply unit 514, 516 or 518, and determines the power consumption PCE based on the measured electronic voltage and electronic current. In some situations, the second power monitoring unit 520 has a sampling rate and a power averaging frequency. The electronic voltage and electronic current driving the speaker 126 are measured at the sampling rate and during each power averaging duration corresponding to the power averaging frequency. More details on the second power monitoring unit 520 are described above with reference to the first power monitoring unit 512.

Referring to FIGS. 4A-4B and 5, in addition to the display panel 302 and driver 140, the display assistant device 120 includes a plurality of additional heat-generating components (e.g., the speaker 126 and the electronic components of the MLB 340) that are located at different portions of the display assistant device 120 with respect to a location of the temperature sensor 136. For each additional heat-generating component, a respective power consumption $P_{SPK}$ or PCE is measured using a distinct power monitoring unit 512 or 520, respectively. The ambient temperature correction unit 522 is configured to determine the ambient temperature correction ΔT based on the power consumptions $P_{DSP}$, $P_{SPK}$ and $P_{CE}$. In some implementations, a lookup table or formula is used to determine the ambient temperature correction ΔT based on the power consumptions $P_{SPK}$, $P_{SPK}$ and $P_{CE}$. Optionally, the lookup table or formula is established by calibrating the ambient temperature correction ΔT with respect to each of the power consumptions $P_{DSP}$, $P_{SPK}$ and $P_{CE}$ for each display assistant device 120 before the display assistant device 120 is shipped out of factory. Optionally, the lookup table or formula is established by modeling the ambient temperature correction ΔT with respect to each of the power consumptions $P_{DSP}$, $P_{SPK}$ and $P_{CE}$ using a software program. When the formula is applied to determine the ambient temperature correction ΔT, the formula is optionally based on a weighted combination of the power consumptions $P_{DSP}$, $P_{SPK}$ and $P_{CE}$.

In some embodiments, the display assistant device 120 has a temperature error tolerance (e.g., ±0.5° C.) for the measured ambient temperature. The display panel 302 or one or more heat generating components may need to be identified as primary heat sources that cause a temperature error to go beyond the temperature error tolerance. Power consumptions of these identified components are monitored for determining the ambient temperature correction ΔT and correcting the ambient temperature $T_M$. In some situations, the display panel 302 and driver 140 accounts for a substantial portion of the temperature error, and only the power consumption $P_{DSP}$ needs to be determined to correct the ambient temperature and satisfy the temperature error tolerance. Alternatively, in some situations, the display panel 302 and driver 140 alone does not account for a substantial portion of the temperature error, and however, accounts for the substantial portion of the temperature drift jointly with one or more heat generating components (e.g., the speaker 126, the processing circuitry 124). The power consumptions of the display driver 140 and the one or more heat generating components need to be determined to correct the ambient temperature and satisfy the temperature error tolerance.

In some embodiments, functions of the ambient temperature correction unit 522, power estimation module 506, and power monitoring units 512 and 520 are implemented according to a temperature monitoring and correction module 182 stored in a memory 122 of the display assistant device 120. Data 186 of power consumptions $P_{DSP}$, $P_{SPK}$, and $P_{CE}$ are stored in the memory 122 as well. The ambient temperature $T_M$ is also recorded as part of event recordings 192 in the memory 122.

Figure 6:
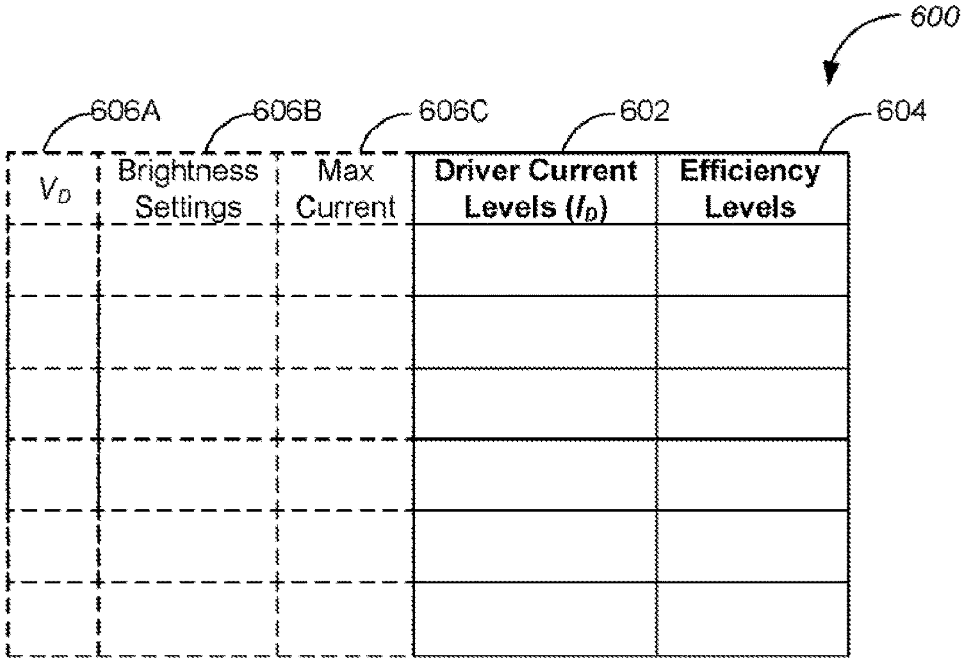
FIG. 6 is an example display efficiency lookup table for estimating power consumption of a display driver of a display assistant device, in accordance with some implementations.

FIG. 6 is an example display efficiency lookup table 600 for estimating power consumption $P_{DSP}$ of a display driver 140 of a display assistant device 120, in accordance with some implementations. As explained above, the power consumption $P_{DSP}$ of the display driver 140 is estimated based on equation (1), combining a predetermined display driver voltage $V_D$, a display driver current $I_D$, and a driver efficiency $\eta_D$. The display driver current $I_D$ is determined based on a brightness setting of the display panel 302. A maximum display driver current is associated with a maximum brightness level, e.g., by factory calibration or according to predefined specifications of the display driver 140. A linear relationship exists between the brightness setting and the display driver current $I_D$. Given the brightness setting, the display driver current $I_D$ is estimated based on the linear relationship. Further, the display efficiency $\eta_D$ is optionally predetermined at an average efficiency level that is averaged from a plurality of display drivers. This fixed display efficiency $\eta_D$ may be applied independently of the brightness setting and corresponding display driver current $I_D$. Alternatively, in some implementations, the display efficiency $\eta_D$ is adjusted based on the display driver current $I_D$.

In some implementations, the lookup table 600 correlates a plurality of efficiency levels 604 with a plurality of predefined driver current levels 602 of the display driver 140, and is used to determine the display efficiency 7/p based on the display driver current $I_D$. Specifically, in an example, the display driver current $I_D$ is identified directly from the plurality of predefined driver current levels 602. A first efficiency level correlates with the display driver current $I_D$ in the lookup table 600. The driver efficiency $\eta_D$ of the display driver 140 is determined to be equal to the first efficiency level. Alternatively, in another example, none of the plurality of predefined driver current levels in the lookup table 600 is equal to the display driver current $I_D$ determined based on the brightness setting, and the display efficiency level $\eta_D$ is determined using linear interpolation. The plurality of predefined driver current levels 602 is ordered in magnitude to an ordered sequence. A second driver current level and a third driver current level that are next to each other are identified in the ordered sequence of the predefined driver current levels. The display driver current $I_D$ has a magnitude in a range defined by the second and third driver current levels. Based on the magnitude of the display driver current $I_D$, the driver efficiency Tip is determined from a second driver efficiency level and a third driver efficiency level corresponding to the second and third driver current levels in the lookup table 600, respectively, e.g., based on linear interpolation.

Further, in some implementations, the lookup table 600 further correlates the plurality of efficiency levels 604 with one or more additional characteristics 606 of the display driver 140 (e.g., the predetermined driver voltage $V_D$ 606A, the brightness setting 606B, and the maximum current 606C), thereby allowing the driver efficiency $\eta_D$ to be estimated more accurately. Conversely, in some implementations not shown here, a display efficiency formula is established to correlate the display efficiency level $\eta_D$ with the display driver current $I_D$ and/or the one or more additional characteristics 606. During the course of correcting an ambient temperature correction ΔT, the display efficiency level $\eta_D$ is derived from the display efficiency formula when the display driver current $I_D$ and/or the one or more additional characteristics 606 are determined.

The lookup table 600 or display efficiency formula is optionally established based on calibrations before the display assistant device 120 is shipped out of factory or based on computer-based modelling implemented before or after the display assistant device 120 is shipped out of factory. The lookup table 600 or display efficiency formula is loaded into a memory of the display assistant device 120, before the display assistant device 120 is shipped out of factory. In some implementations, the display assistant device is coupled to a remote server via one or more communication networks, and the lookup table 600 or display efficiency formula is optionally updated under the control of the remote sever.

Figure 7:
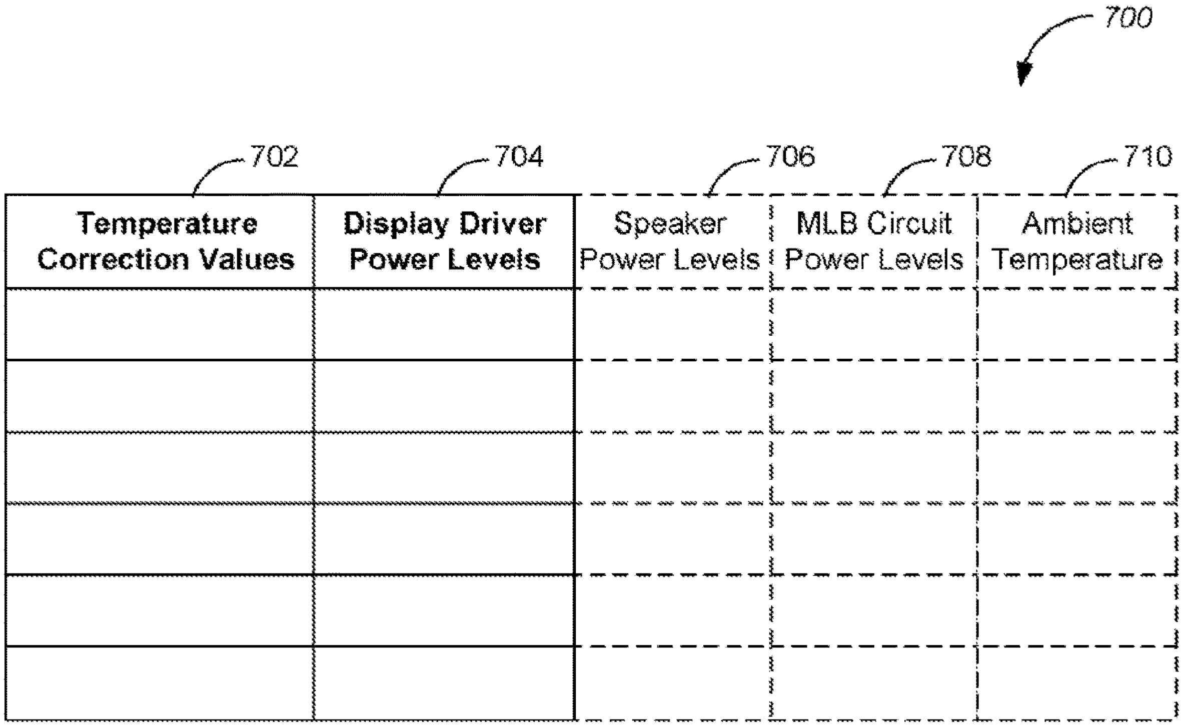
FIG. 7 is an example temperature correction lookup table for determining an ambient temperature correction based on power consumption levels of heat generating components in a display assistant device, in accordance with some implementations.

FIG. 7 is an example temperature correction lookup table 700 for determining an ambient temperature correction ΔT based on a plurality of power consumption levels, in accordance with some implementations. The display assistant device 120 has a temperature error tolerance (e.g., ±0.5° C.) for the measured ambient temperature $T_M$, and the display panel 302 or one or more additional heat generating components constitute one or more primary heat sources that cause a temperature error of the measured ambient temperature $T_M$ to go beyond the temperature error tolerance. It is determined that the measured ambient temperature $T_M$ satisfies the temperature error tolerance when the temperature error caused by the one or more primary heat sources is corrected. The temperature correction lookup table 700 correlates a plurality of temperature correction values with a plurality of power levels of each of the one or more primary heat sources.

In some implementations, the measured ambient temperature $T_M$ satisfies the temperature error tolerance when the temperature error caused by the display driver 140 is corrected. The lookup table 700 correlates a plurality of temperature correction values 702 with a plurality of display power levels 704 of the display driver 140. In some implementations, the power consumption $P_{DSP}$ of the display driver 140 is determined based on a predetermined display driver voltage VD, a display driver current ID, and a driver efficiency $\eta_D$, and matches one of the plurality of display power levels 704 in the lookup table 700. The ambient temperature correction ΔT associated with the power consumption $P_{DSP}$ is determined as one of the plurality of temperature correction values 702 corresponding to the matched one of the plurality of display power levels 704 in the lookup table 700. Alternatively, the power consumption $P_{DSP}$ of the display driver 140 as determined does not match any of the plurality of display power levels 704 in the lookup table 700, and the corresponding ambient temperature correction ΔT is determined based on linear interpolation. That said, the display power levels 704 of the display driver 140 are ordered in magnitude to an ordered sequence. The power consumption $P_{DSP}$ of the display driver 140 as determined is in a ranged defined by two neighboring power levels of the display drier 140 in the ordered sequence, and the corresponding ambient temperature correction ΔT is linearly interpolated from two temperature correction values corresponding to the two neighboring power levels of the display driver 140 in the ordered sequence.

In some implementations, the measured ambient temperature $T_M$ satisfies the temperature error tolerance when the temperature error caused by the display driver 140 and one or more additional heat generating components (e.g., the speaker 126, MLB circuit, or a combination thereof) is corrected. In addition to the display power levels 704, the lookup table 700 correlates the plurality of temperature correction values 702 with a plurality of power levels of the one or more heat generating components (e.g., a plurality of speaker power levels 706, a plurality of MLB circuit power levels 708) as well. The ambient temperature correction ΔT may be determined directly or interpolated indirectly from the plurality of temperature correction values 702.

In some implementations, a correlation between the temperature correction values 702 and the power levels 704-708 varies with an ambient temperature $T_M$. The lookup table 700 also associates the correlation with an ambient temperature levels 710. Optionally, the ambient temperature levels 710 are based on the measured ambient temperature $T_M$.

Conversely, in some implementations not shown here, a temperature correction formula is established to correlate an ambient temperature correction ΔT with a power consumption of a display driver 140, one or more power consumptions of the one or more heat generating components, and/or the measured ambient temperature. The temperature correction formula is optionally established based on calibrations implemented before the display assistant device is shipped out of factory. Examples of the temperature correction formula include, but are not limited to:

$$\Delta T = f(w_1 P_{DSP} + W_2 P_{SPK} W_3 P_{EC}, T_M) \quad (2)$$

$$\Delta T = f_1(P_{DSP}, T_M) + f_2(P_{SPK}, T_M) + f_3(P_{EC}, T_M) \quad (3)$$

where $w_1$, $w_2$, and $w_3$ are weights applied to combine power consumptions of the display driver 140, speaker 126, and components of the MLB 340, respectively, and each of the functions f, $f_1$, $f_2$, and $f_3$ is optionally linear or non-linear with respect to the corresponding power consumption and ambient temperature $T_M$. Each weight that is optionally determined based on a distance and/or a thermal conduction rate between the temperature sensor 136 and the respective selected heat generating component. During the course of temperature correction, the corresponding power consumptions are measured or estimated, and the ambient temperature correction ΔT is determined from the power consumptions using the temperature correction formula.

Additionally, in some implementations, the lookup table 700 or temperature correction formula is based on a particular device type and a location of the temperature sensor 136 within the display assistant device 120, and is calibrated or modelled before each display assistant device 120 is shipped out of factory. The lookup table 700 or temperature correction formula is optionally loaded into a memory of the display assistant device 120. Alternatively, in some implementations, the display assistant device 120 is coupled to a remote server via one or more communication networks, and the lookup table 700 or temperature correction formula is loaded or updated under the control of the remote server.

Each power consumption has a respective power variance caused by corresponding power estimation or measurement, and the respective power variance results in a respective temperature correction error. For example, the speaker 126 has a power consumption $P_{SPK}$ of 2W, which is measured with a power variance up to 5%, and the corresponding ambient temperature error can be determined to be less than 0.1° C. A combination of the temperature correction errors associated with the power variances of the power consumptions can be controlled within the predefined temperature error tolerance (e.g., +0.5° C.).

Figure 8:
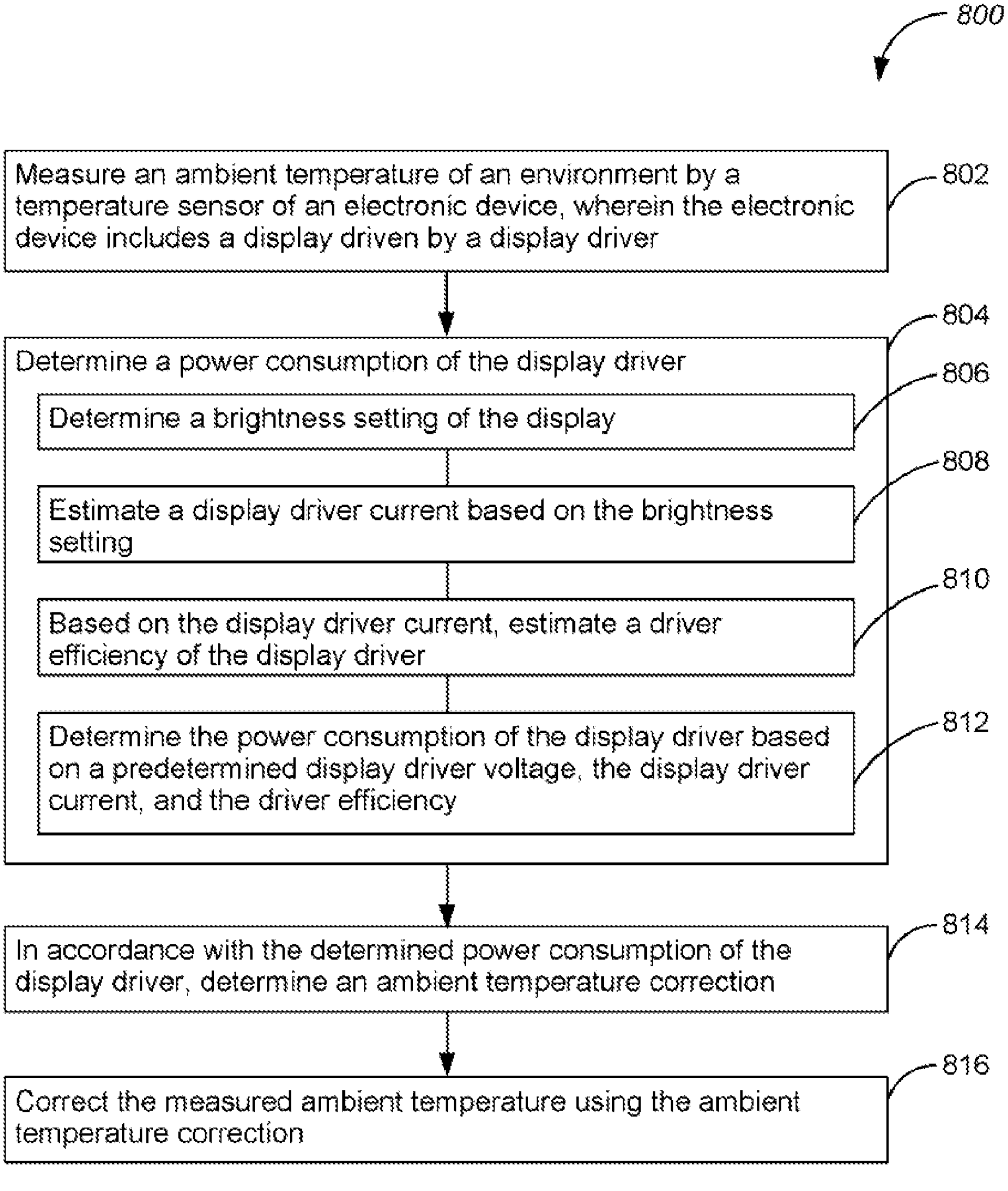
FIG. 8 is a flow chart of a method for correcting ambient temperature measurement in a display assistant device, in accordance with some implementations.

FIG. 8 is a flow chart of a method 800 for correcting ambient temperature measurement, in accordance with some implementations. The method 800 is implemented at an electronic device (e.g., a display assistant device 120 that is voice-activated and has a microphone and a touch-sensitive display surface). The electronic device optionally includes a non-transitory computer-readable medium, storing one or more programs (e.g., a temperature monitoring and correction module 182) to implement the method 800. The electronic device includes a temperature sensor 136, a display panel 302 and a display driver 140, one or more processors, and memory storing one or more programs configured for execution by the one or more processors. The one or more programs include instructions for implementing the method 800. The display driver 140 is configured to drive the display panel 302. In some implementations, the display panel 302 uses light emitting diode (LED) backlighting. The temperature sensor 136 measures (802) an ambient temperature TH of an environment where the electronic device is disposed. In some implementations, the electronic device includes a device housing and a plurality of additional heat-generating components (e.g., a speaker 126 and electronic components on an MLB 340) enclosed within the device housing. The temperature sensor 136 is disposed at a location that is immediately adjacent to the device housing and corresponds to an average distance away from the display driver 140 and the plurality of additional heat-generating components. Optionally, the location of the temperature sensor 136 is selected within the device housing to maximize the average distance. The temperature sensor 136 is also at least partially insulated thermally from the display driver 140 and additional heat-generating components (e.g., being partially enclosed with a thermally insulating material).

The electronic device determines (804) a power consumption $P_{DSP}$ of the display driver 140. Specifically, the electronic device determines (806) a brightness setting of the display, and estimates (808) a display driver current ID based on the brightness setting. Based on the display driver current, the electronic device estimates (810) a driver efficiency of the display driver, and determines (812) the power consumption $P_{DSP}$ of the display driver 140 based on a predetermined display driver voltage $V_D$, the display driver current $I_D$, and the driver efficiency $\eta_D$. An ambient temperature correction ΔT is determined (814) in accordance with the determined power consumption of the display driver, and used to correct (816) the measured ambient temperature $T_M$.

In some implementations, the driver efficiency $\eta_D$ of the display driver 140 is established based on the display driver current $I_D$ using a predefined display efficiency lookup table 600 that correlates a plurality of efficiency levels 604 with a plurality of predefined drive current levels 602 of the display driver 140. Further, in some implementations, the display driver current ID is identified in the plurality of predefined drive current levels 602 and corresponds to a first efficiency level in the display efficiency lookup table. The driver efficiency $\eta_D$ of the display driver 140 is thereby associated with the first efficiency level. Alternatively, in some implementations, the plurality of predefined drive current levels 602 is ordered in magnitude to an ordered sequence. A second driver current level and a third driver current level that are next to each other are identified in the ordered sequence of the predefined drive current levels. The display driver current ID has a magnitude in a range defined by the second and third driver current levels. Based on the magnitude of the display driver current, the driver efficiency is determined from a second driver efficiency level and a third driver efficiency level corresponding to the second and third driver current levels in the display efficiency lookup table 600, respectively. More details on determining the driver efficiency $\eta_D$ using the display efficiency lookup table 600 are explained above with reference to FIG. 6.

In some implementations, the ambient temperature correction ΔT is determined based on the determined power consumption $P_{DSP}$ of the display driver using a temperature correction lookup table 700. The temperature correction lookup table 700 correlating a plurality of correction values 702 with a plurality of display driver power levels 704. Further, in some implementations, the temperature correction lookup table 700 is based on a particular device type and a location of the temperature sensor within the electronic device. More details on determining the ambient temperature correction ΔT based on the temperature correction lookup table 700 are explained above with reference to FIG. 7.

Additionally, in some implementations, the electronic device includes an additional heat-generating component and directly measures power consumption of the additional heat-generating component using a power monitoring unit (e.g., units 512 and 520 in FIG. 5). The ambient temperature correction ΔT is determined based on the estimated power consumption $P_{DSP}$ of the display driver and the directly measured power consumption of the additional heat-generating component. In an example electronic device the additional heat-generating component includes a processor core of the electronic device. In another example, the additional heat-generating component includes a speaker 126. Further, in some implementations, the ambient temperature correction ΔT is determined based on a temperature correction lookup table 700 correlating the plurality of correction values 702 with a plurality of display driver power levels and a plurality of speaker power levels 706 or 708 of the additional heat-generating component as well. Additionally, in some implementations, the power monitoring unit has a sampling rate and a power averaging frequency, and measures an electronic voltage and an electronic current of the additional heat-generating component at the sampling rate and during each power averaging duration corresponding to the power averaging frequency. During each power averaging duration, the power monitoring unit determines the power consumption of the additional heat-generating component by determining a power consumption level of the additional heat-generating component at the sampling rate based on the electronic voltage and current and averaging the power consumption level of the additional heat-generating component during the respective power averaging duration.

In some implementations, the electronic device includes a plurality of additional heat-generating components that are located at different portions of the electronic device with respect to a location of the temperature sensor 136. For each additional heat-generating component, a distinct power monitoring unit measures a respective power consumption of the additional heat-generating component. The ambient temperature correction ΔT is determined based on both the power consumption $P_{DSP}$ of the display driver and the power consumptions of the additional heat-generating components. More details on determining the ambient temperature correction ΔT based on the power consumptions of the heat generating components are discussed above with reference to FIG. 5.

Alternatively, the power consumption $P_{DSP}$ of the display driver 140 may be directly monitored using a power monitoring unit. This constitutes a more expensive solution than estimating the power consumption $P_{DSP}$ based on the brightness setting and the display efficiency lookup table 600. In some cost-sensitive situations, estimation of the power consumption $P_{DSP}$ based on the brightness setting and lookup table is preferred over using a power monitoring unit directly.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if' is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that a "home environment" may refer to environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed:

1. A method for correcting temperature measurement, the method comprising:

measuring an ambient temperature of an environment by a temperature sensor of an electronic device, wherein the electronic device includes a first electronic component driven by a second electronic component;

determining a first setting of the first electronic component;

estimating a second electronic component current based on a linear relationship between the first setting and the second electronic component current, where the first setting corresponds to an energy level to which the first electronic component has been adjusted;

identifying a first driver efficiency value corresponding to a predetermined efficiency value and adjusting the first driver efficiency value based on the estimated second electronic component current to determine a second driver efficiency value of the second electronic component; and determining a power consumption of the second electronic component based on a predetermined second electronic component voltage, the estimated second electronic component current, and the determined second driver efficiency value;

in accordance with the determined power consumption of the second electronic component, determining an ambient temperature correction; and correcting the measured ambient temperature using the ambient temperature correction.

2. The method as recited in claim 1, wherein:

the electronic device includes a housing and a plurality of additional heat-generating components enclosed within the housing;

the temperature sensor is disposed at a location that is immediately adjacent to the housing and corresponds to an average distance away from the second electronic component and the plurality of additional heat-generating components, the location being selected in the housing to maximize the average distance; and the temperature sensor is at least partially insulated thermally from the second electronic component and additional heat-generating components.

3. The method as recited in claim 1, wherein the identified driver efficiency value of the second electronic component is established based on the estimated second electronic component current using a predefined display efficiency lookup table that correlates a plurality of efficiency levels with a plurality of predefined drive current levels of the second electronic component.

4. The method as recited in claim 1, wherein the identifying the identified driver efficiency value of the second electronic component further comprises:

identifying the second electronic component current in a plurality of predefined drive current levels;

determining a first efficiency level from a display efficiency lookup table based on the identified second electronic component current; and associating a driver efficiency of the second electronic component with the first efficiency level.

5. The method as recited in claim 4, wherein the plurality of predefined drive current levels is ordered in magnitude to an ordered sequence, and the identifying the driver efficiency value of the second electronic component further comprises:

identifying a second driver current level and a third driver current level that are next to each other in the ordered sequence of the predefined drive current levels, where the estimated second electronic component current has a magnitude in a range defined by the second driver current level and the third driver current level; and based on the magnitude of the estimated second electronic component current, determining the driver efficiency value from a second driver efficiency level and a third driver efficiency level, the second driver efficiency level and the third driver efficiency level corresponding to the second driver current level and the third driver current level in the display efficiency lookup table, respectively.

6. The method as recited in claim 1, wherein the ambient temperature correction is determined based on the determined power consumption of the second electronic component using a temperature correction lookup table that correlates a plurality of correction values with a plurality of second electronic component power levels.

7. The method as recited in claim 6, wherein the temperature correction lookup table is based on a particular device type and a location of the temperature sensor within the electronic device.

8. The method as recited in claim 1, wherein the first electronic component uses light emitting diode (LED) backlighting.

9. The method as recited in claim 1, wherein the electronic device includes a voice-activated display assistant device having a microphone and a touch-sensitive display surface.

10. An electronic device comprising:

a temperature sensor;

a first electronic component driven by a second electronic component;

one or more processing devices; and memory communicatively coupled with and readable by the one or more processing devices and having stored therein processor-readable instructions which, when executed by the one or more processing devices, cause the one or more processing devices to perform operations comprising:

measuring an ambient temperature of an environment by the temperature sensor;

determining a first setting of the first electronic component;

estimating a second electronic component current based on a linear relationship between the first setting and the second electronic component current, where the first setting corresponds to an energy level to which the first electronic component has been adjusted;

identifying a first driver efficiency value corresponding to a predetermined efficiency value and adjusting the first driver efficiency value based on the estimated second electronic component current to determine a second_driver efficiency value of the second electronic component; and determining a power consumption of the second electronic component based on a predetermined second electronic component voltage, the estimated second electronic component current, and the determined second driver efficiency value;

in accordance with the determined power consumption of the second electronic component, determining an ambient temperature correction; and correcting a measured ambient temperature using the ambient temperature correction.

11. The electronic device as recited in claim 10, further comprising:

a housing;

a plurality of additional heat-generating components enclosed within the housing;

wherein the temperature sensor is disposed at a location that is immediately adjacent to the housing and corresponds to an average distance away from the second electronic component and the plurality of additional heat-generating components, the location being selected in the housing to maximize the average distance; and wherein the temperature sensor is at least partially insulated thermally from the second electronic component and additional heat-generating components.

12. The electronic device as recited in claim 10, wherein the identified driver efficiency value of the second electronic component is established based on the estimated second electronic component current using a predefined display efficiency lookup table that correlates a plurality of efficiency levels with a plurality of predefined drive current levels of the second electronic component.

13. The electronic device as recited in claim 10, wherein the ambient temperature correction is determined based on the determined power consumption of the second electronic component using a temperature correction lookup table that correlates a plurality of correction values with a plurality of second electronic component power levels.

14. The electronic device as recited in claim 10, further comprising:

a plurality of additional heat-generating components that are located at different portions of the electronic device with respect to a location of the temperature sensor;

wherein the operations further comprise, for each additional heat-generating component, measuring a respective power consumption of the additional heat-generating component using a distinct power monitoring unit; and wherein the ambient temperature correction is determined based on the power consumption of the second electronic component and the power consumption of the additional heat-generating components.

15. One or more non-transitory, processor-readable media having machine-readable instructions thereon which, when executed by one or more processing devices, cause the one or more processing devices to perform operations comprising:

measuring an ambient temperature of an environment by a temperature sensor of an electronic device, wherein the electronic device includes a first electronic component driven by a second electronic component;

determining a first setting of the first electronic component;

estimating a second electronic component current based on a linear relationship between the first setting and the second electronic component current, where the first setting corresponds to an energy level to which the first electronic component has been adjusted;

identifying a first driver efficiency value corresponding to a predetermined efficiency value and adjusting the first driver efficiency value based on the estimated second electronic component current to determine a second driver efficiency value of the second electronic component; and determining a power consumption of the second electronic component based on a predetermined second electronic component voltage, the estimated second electronic component current, and the determined second driver efficiency value;

in accordance with the determined power consumption of the second electronic component, determining an ambient temperature correction; and correcting the measured ambient temperature using the ambient temperature correction.

16. The one or more non-transitory, processor-readable media as recited in claim 15, wherein the electronic device includes an additional heat-generating component, and the operations further comprise:

measuring a power consumption of the additional heat-generating component using a power monitoring unit;

wherein the ambient temperature correction is determined based on the power consumption of the second electronic component and the power consumption of the additional heat-generating component.

17. The one or more non-transitory, processor-readable media as recited in claim 16, wherein the additional heat-generating component includes a processor core of the electronic device.

18. The one or more non-transitory, processor-readable media as recited in claim 16, wherein the additional heat-generating component include a speaker.

19. The one or more non-transitory, processor-readable media as recited in claim 16, wherein the ambient temperature correction is determined based on a temperature correction lookup table correlating a plurality of second electronic component power levels and a plurality of heat power levels of the additional heat-generating component with a plurality of correction values.

20. The one or more non-transitory, processor-readable media as recited in claim 16, wherein the power monitoring unit has a sampling rate and a power averaging frequency, and the operations further comprise:

measuring an electronic voltage and an electronic current of the additional heat-generating component using the power monitoring unit at the sampling rate and during each power averaging duration corresponding to the power averaging frequency; and during each power averaging duration, determining the power consumption of the additional heat-generating component, including:

determining a power consumption level of the additional heat-generating component at the sampling rate based on the electronic voltage and current; and averaging the power consumption level of the additional heat-generating component.

* * * * *